(12) United States Patent
Kornfeld et al.

(10) Patent No.: US 8,904,047 B1
(45) Date of Patent: Dec. 2, 2014

(54) CLOUD CAPABLE STORAGE SYSTEM WITH HIGH PERORMANCE NOSQL KEY-VALUE PAIR OPERATING ENVIRONMENT

(75) Inventors: Sergey Kornfeld, Waltham, MA (US); John D. Hushon, Jr., Medfield, MA (US); Lev Knopov, Brookline, MA (US); Igor Achkinazi, Northborough, MA (US); Luis O. Torres, Shrewsbury, MA (US); Adnan Sahin, Needham, MA (US); Ahmet Kirac, Guttenberg, NJ (US); Bryan Duerk, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 218 days.

(21) Appl. No.: 13/538,360

(22) Filed: Jun. 29, 2012

(51) Int. Cl.
 *G06F 3/00* (2006.01)
 *G06F 17/30* (2006.01)
(52) U.S. Cl.
 CPC .... *G06F 17/30292* (2013.01); *G06F 17/30371* (2013.01); *G06F 17/30327* (2013.01)
 USPC .......................................................... 710/7
(58) Field of Classification Search
 None
 See application file for complete search history.

(56) References Cited

U.S. PATENT DOCUMENTS

| | | | | |
|---|---|---|---|---|
| 6,058,373 | A * | 5/2000 | Blinn et al. ................ | 705/26.81 |
| 7,035,970 | B1 * | 4/2006 | Zahavi ......................... | 711/114 |
| 7,181,439 | B1 * | 2/2007 | Lent et al. ............................ | 1/1 |
| 7,584,279 | B1 * | 9/2009 | Chapman ..................... | 709/226 |
| 7,730,237 | B1 * | 6/2010 | Veprinsky et al. .............. | 710/52 |
| 2006/0156064 | A1 * | 7/2006 | Damani et al. ................... | 714/16 |
| 2006/0161986 | A1 * | 7/2006 | Singh et al. ...................... | 726/24 |
| 2007/0043879 | A1 * | 2/2007 | Vidya Sagar ................ | 709/246 |
| 2007/0288693 | A1 * | 12/2007 | Rajan et al. ..................... | 711/114 |
| 2009/0252159 | A1 * | 10/2009 | Lawson et al. ................ | 370/352 |
| 2010/0058013 | A1 * | 3/2010 | Gelson et al. ................ | 711/162 |
| 2010/0217953 | A1 * | 8/2010 | Beaman et al. ................ | 711/216 |
| 2010/0299438 | A1 * | 11/2010 | Zimmerman et al. ........ | 709/226 |
| 2011/0072126 | A1 * | 3/2011 | Wujuan et al. ................ | 709/224 |
| 2011/0289052 | A1 * | 11/2011 | Rambacher et al. .......... | 707/624 |
| 2012/0117067 | A1 * | 5/2012 | Yakubovich et al. ......... | 707/737 |

(Continued)

OTHER PUBLICATIONS

"Key-Value stores: a practical overview" by Marc Seeger, Sep. 21, 2009.*

"Key-Value Pair Databases in a Big Data Environment" by Judith Hurwitz, Alan Nugent, Fern Halper, and Marcia Kaufman, Nov. 13, 2013.*

(Continued)

*Primary Examiner* — Henry Tsai
*Assistant Examiner* — Jing-Yih Shyu
(74) *Attorney, Agent, or Firm* — Muirhead and Saturnelli, LLC

(57) ABSTRACT

Described are techniques for processing data operations. A request is sent from an application to perform a data operation on a key-value data store. The request is in accordance with a first application-level protocol for performing the data operation on the key-value data store and includes a first key of a first key-value pair used by a data storage system to perform the data operation. The request is received at the data storage system such as by a key-value server that processes requests in accordance with the first application-level protocol for the key-value data store. In response to receiving the request at the data storage system, first processing is performed on the data storage system for the data operation and a response is returned to the application.

18 Claims, 14 Drawing Sheets

(56) References Cited

U.S. PATENT DOCUMENTS

| | | | |
|---|---|---|---|
| 2012/0179723 A1* | 7/2012 | Lin et al. | 707/792 |
| 2013/0007007 A1* | 1/2013 | Pan et al. | 707/747 |
| 2013/0054869 A1* | 2/2013 | Tolia et al. | 711/102 |
| 2013/0103658 A1* | 4/2013 | Travis | 707/700 |
| 2013/0226890 A1* | 8/2013 | Markus | 707/703 |
| 2013/0226891 A1* | 8/2013 | Markus | 707/703 |
| 2013/0297580 A1* | 11/2013 | Markus et al. | 707/703 |
| 2013/0332608 A1* | 12/2013 | Shiga et al. | 709/226 |

OTHER PUBLICATIONS

"Implementing a Key/Value Store" Microsoft Developer Network, Sep. 2013.*

Kornfeld, Sergey, "Cloud Capable Storage Platform With Computation Operating Environment for Applications", U.S. Appl. No. 13/245,962, filed Sep. 27, 2011.

Kornfeld, Sergey, "Split Target Data Transfer", U.S. Appl. No. 13/537,614, filed Jun. 29, 2012.

* cited by examiner

US 8,904,047 B1

CLOUD CAPABLE STORAGE SYSTEM WITH HIGH PERORMANCE NOSQL KEY-VALUE PAIR OPERATING ENVIRONMENT

BACKGROUND

1. Technical Field

This application generally relates to data storage systems or platforms, and more particular, to use of key-value pairs (KVPs) and associated data stores.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

An application, such as a database application, may execute on a host where the application performs I/O (input/output) operations. The host may transmit the data operation to the data storage system over any one or more different paths to request that the data storage system perform the requested operation.

SUMMARY OF THE INVENTION

In accordance with one aspect of the invention is a method of processing data operations comprising: sending a request from an application to perform a data operation on a key-value data store, the request being in accordance with a first application-level protocol for performing the data operation on the key-value data store and including a first key of a first key-value pair used by a data storage system to perform the data operation; receiving the request at the data storage system, wherein the request is received by a key-value server that processes requests in accordance with the first application-level protocol for the key-value data store; performing first processing on the data storage system to perform the data operation in response to receiving the request at the data storage system; and returning a response to the application. The first processing may include mapping the first key to a first value that is a first data item corresponding to the first key. The key-value data store may use key-value pairs where each of the key-value pairs may include a unique key that is mapped to a corresponding data item. The first key-value pair may be one of the key-value pairs and may include the first key that is mapped to the first data item. The mapping may use a mapping table that maps the first key to a physical location including the first data item. The mapping table may specify a mapping for each of the key-value pairs by mapping the unique key of each key-value pair to a corresponding data item stored on solid state storage. The application may be executing on any of a first host or a first computation node of the data storage system. The data storage system may process one or more other requests also sent from any of a second host or a second computation node of the data storage system in accordance with any of a block-based protocol and a file-based protocol. The one or more other requests may be sent from any of the second host or the second computation node as a result of second processing performed thereon. The second processing may include processing performed by at least one of a file system and a logical volume manager. The request may be to perform the data operation on the key-value data store and the request may be sent from any of the first host or the first computation node without having processing performed by a file system and without having processing performed by a logical volume manager. The first processing on the data storage system may use the first key to directly map the first key into an internal data storage system representation used to identify a location of the first data item. The data operation may perform any of: writes a first data item mapped to the first key, reads the first data item mapped to the first key, deletes the first data item mapped to the first key, deletes the first key and first data item from the key-value data store, and creates a new entry in the key-value data store whereby the new entry has the first key mapped to the first data item.

In accordance with another aspect of the invention is a system comprising: a storage grid including a plurality of components where the components include one or more storage devices; a key-value data store having data stored on at least one of the one or more storage devices; a plurality of computation nodes, each computation node including one or more processors, wherein a first of the plurality of computation nodes sends a request to the storage grid to perform the data operation on the key-value data store, the request being in accordance with the application level protocol for performing the data operation on the key-value data store, wherein the request includes a first key of a first key-value pair used to perform the data operation; an interface facilitating communications between the plurality of computation nodes and the storage grid; and a computer readable medium comprising code stored thereon for: receiving the request from the first computation node to perform the data operation on the key-value data store; processing the request for performing the data operation on the key-value data store that is received from the first computation node in accordance with the application level protocol; and returning a response to the first computation node. The plurality of computation nodes may include a second computation node including a plurality of software layers comprising a file system layer and a logical volume manager. A second request to perform a data operation may be sent from the second computation node to the storage grid as a result of processing performed by the plurality of software layers. The second request may include data in accordance with any of a file-based protocol and a block-based protocol. The first computation node may include a second plurality of software layers including the file system layer and the logical volume manager, and wherein the first computation node may send the first request without performing processing by the second plurality of software layers. The first computation node may execute code for a key-value client. The key-value data store may use key-value pairs. Each of the key-value pairs may include a unique key that is mapped to a corresponding data item. The first key-value pair may be one of the key-value pairs and may include the first key that is mapped to the first data item. Processing the request for performing the data operation on the key-value data store that is received from the first computation node in accordance with the application level protocol may include using a mapping table that maps the first key to a physical location including the first data item. The mapping table may specify a mapping for each of the key-value pairs by mapping the unique key of each key-value pair to a corresponding data item stored on solid state storage. The system may perform a plurality of data services including any of data replication, mirroring, data backup, data recovery, and data restoration. Any one or more of the plurality of data services may be performed for the key-value data store.

In accordance with another aspect of the invention is a system comprising: a data storage system including a key-value data store, a front-end director and a first computer readable medium comprising code stored thereon for a key-value server, wherein the front end director receives a request from an application to perform a data operation on the key-value data store, wherein the request to perform the data operation on the key-value data store is then further processed by the key-value server, wherein the key-value server processes the request in accordance with an application level protocol for performing the data operation on the key-value data store and wherein the first computer readable medium further comprises code stored thereon to process the request in connection with performing the data operation, the first computer readable medium comprising code for: performing first processing to service the data operation; and returning a response to the application. The system further comprises one or more hosts including a host sending the request from the application executing on the host and wherein the host includes a second computer readable medium comprising code thereon for: sending the request to perform the data operation on the key-value data store, the request being in accordance with the application level protocol for performing the data operation on the key-value data store, wherein the request includes a first key of a first key-value pair used by the data storage system to perform the data operation. A mapping table may be used to map the first key to a first value of the first key-value pair.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
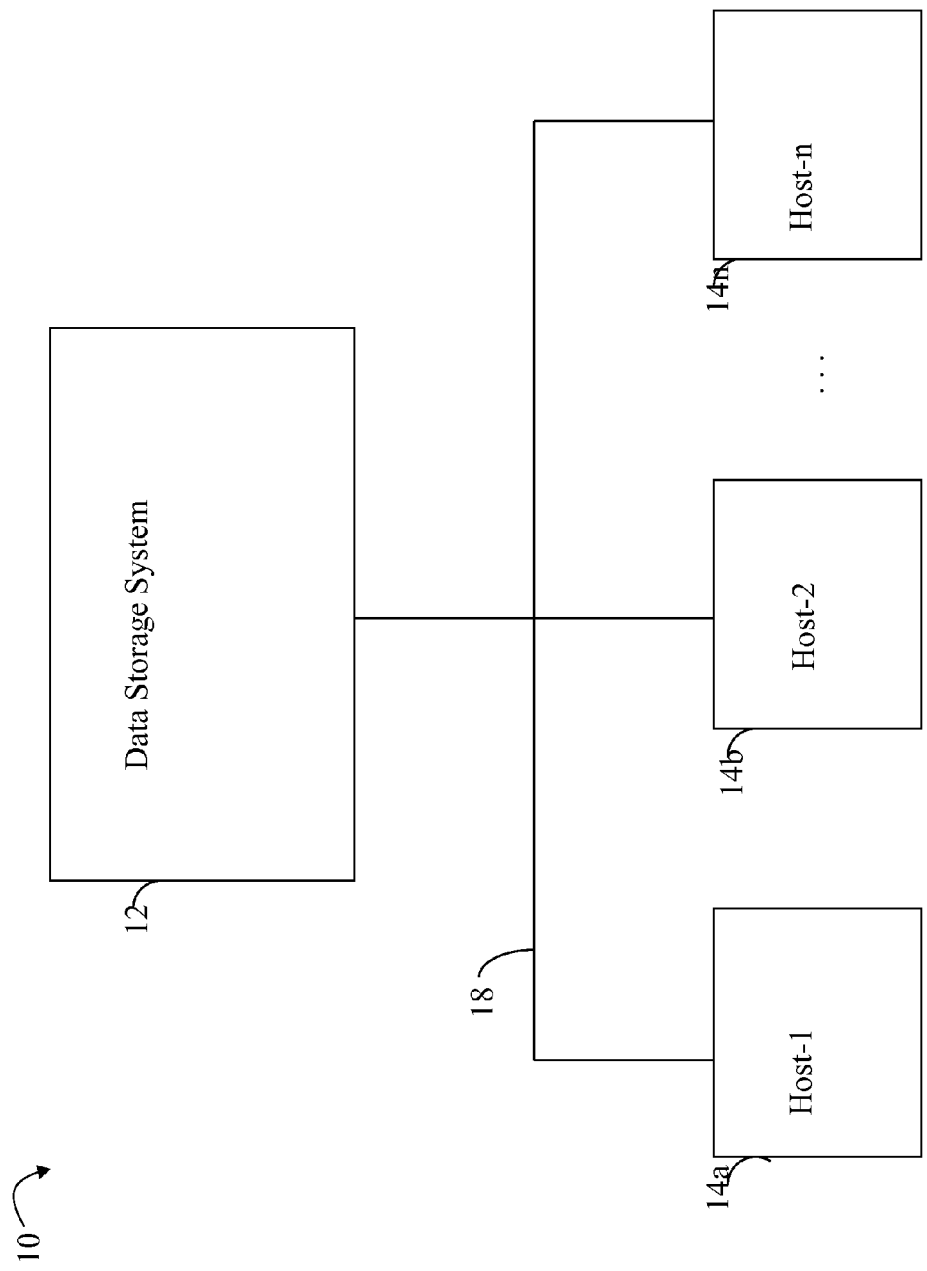
FIGS. 1 and 2C are examples of embodiments of systems that may utilize the techniques described herein.

Referring to FIG. 1, shown is an example of an embodiment of a system that may be used in performing the techniques described herein. The system 10 includes a data storage system 12, such as a data storage array or more generally a data storage platform, connected to host computer systems 14a-14n through communication medium 18. In this embodiment of the system 10, the N host computer systems 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host computer systems 14a-14n may access and communicate with the data storage system 12, and may also communicate with others included in the system 10.

Each of the host computer systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computer systems 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI, Fibre Channel, or iSCSI, Fibre Channel over Ethernet, SRP (SCSI RDMA (Remote Direct Memory Access) Protocol) over Infiniband, SDP (Sockets Direct Protocol) over Infiniband, and the like. Some or all of the connections by which the hosts and data storage system 12 may be connected to the communication medium 18 may pass through other communication devices, such as those in the EMC® Connectrix® family or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computer systems 14a-14n may issue a data request to the data storage system 12 to perform a data operation. For example, an application executing on one of the host computer systems 14a-14n may perform a read or write operation resulting in one or more data requests to the data storage system 12. It should be noted that the data storage system 12 of FIG. 1 may physically be a single data storage system, such as a single data storage array as EMC's Symmetrix™ VMAX™ data storage system, as well one or more other data storage systems as may vary with embodiment.

Figure 2A:
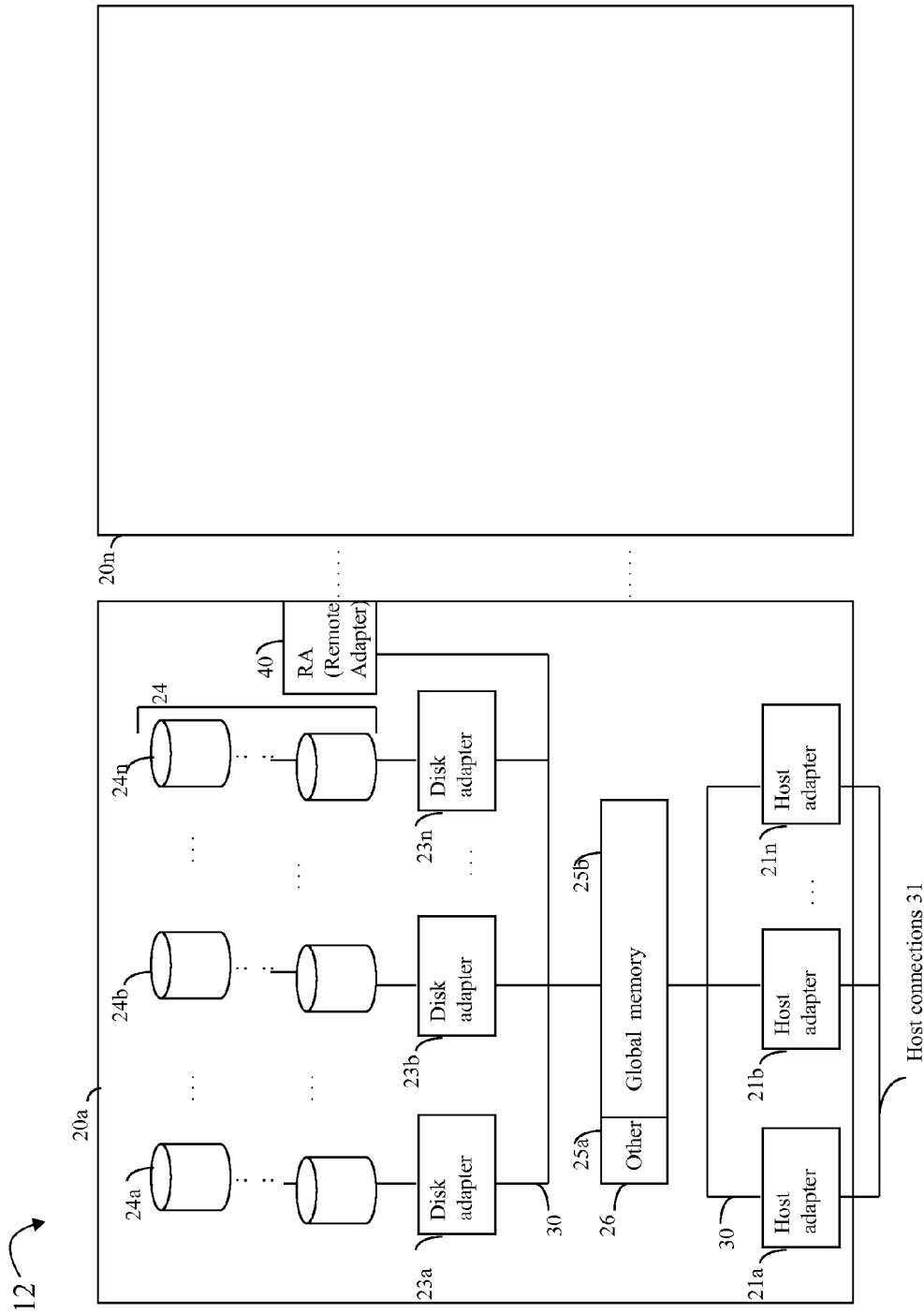
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host computer systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or, more generally, data storage devices 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host computer systems and the global memory. In an embodiment, the HA may be generally characterized as a Front End Adapter (FA) which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component. A DA is an example of such a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the data storage system 20a is an RA or remote adapter 40. The RA may be hardware including a processor used to facilitate communication between data storage systems, such as between two of the same or different types of data storage systems. For example, the RA may be used to facilitate communications between two Symmetrix data storage systems as in connection with the Remote Data Facility (RDF) product provided by EMC Corporation of Hopkinton, Mass.

Host computer systems provide data and access control information through channels to the data storage systems, and the data storage systems may also provide data to the host computer systems also through the channels. The host computer systems do not address the disk drives of the data storage systems directly, but rather access to data may be provided to one or more host computer systems from what the host computer systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host computer system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
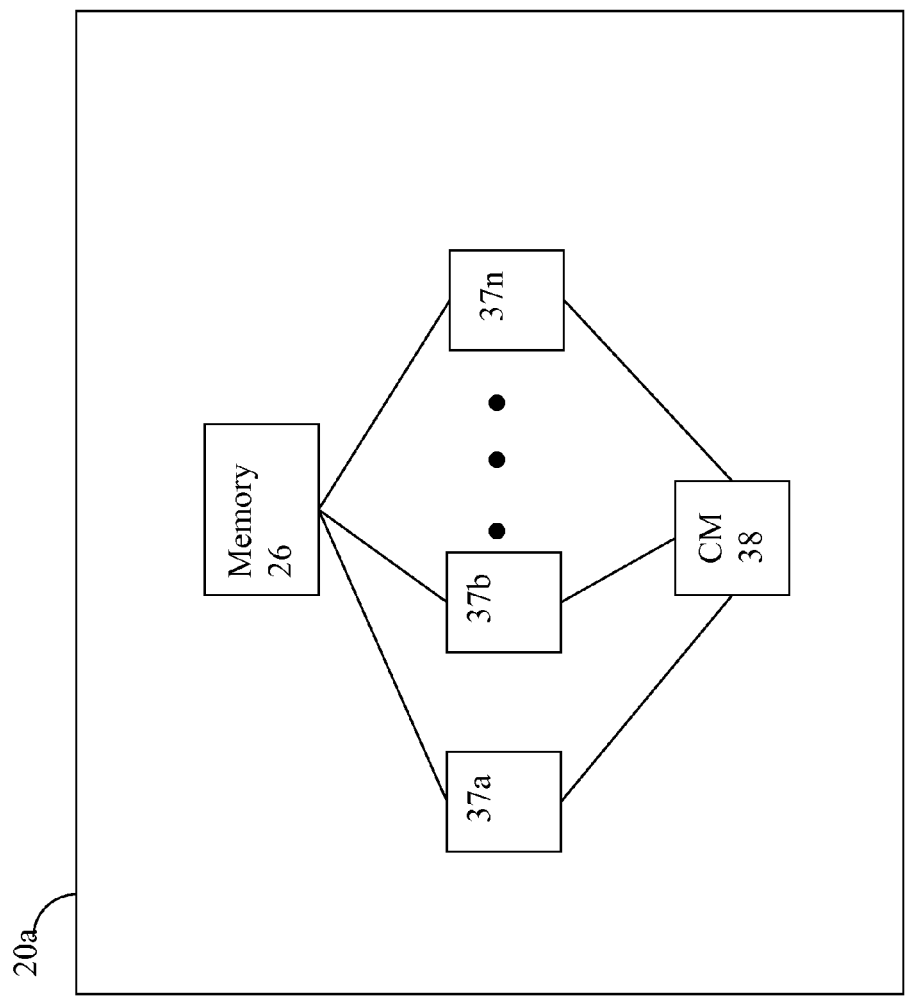
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In connection with data storage on one or more data storage systems, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications. In such embodiments, different one of the storage devices 24a-24n may belong to any one of the storage tiers. For example, an embodiment in accordance with techniques herein may define two storage tiers including a first tier of all SSDs (solid state devices or drives) and a second tier of all non-SSD drives. An SSD is a data storage device that uses solid-state memory to store persistent data. An SSD using SRAM or DRAM, rather than flash memory, may also be referred to as a RAM drive. SSD may refer generally to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices are flash drives or devices. More generally, an embodiment of a data storage system in an embodiment in accordance with techniques herein may also be used with any type of SSD although following paragraphs may make reference to a particular type such as a flash device or flash memory device. As another example, an embodiment in accordance with techniques herein may define three storage tiers including a first tier of all SSD drives which are flash drives, a second tier of all FC drives (Fibre channel rotating disk drives), and a third tier of all SATA drives (rotating disk drives). The foregoing are some examples of tier definitions and other tier definitions may be specified in accordance with techniques herein. Additionally, each of the two or more storage tiers that may be included in an embodiment may be characterized as having an associated performance classification based on attributes or performance characteristics of the storage tier. For example, in an embodiment including 3 storage tiers as described above, the SSD or flash-based storage tier may be the highest performance storage tier, the FC drive tier may be the second or next highest performance storage tier, and the SATA drive tier may be the lowest performance storage tier relative to the SSD and FC tiers.

What will now be described are techniques that may be used in connection with key-value pairs (KVPs) for performing data operations on key-value (KV) data stores. KV data stores may be characterized as a data store whereby data operations are performed using KVPs. As described elsewhere herein in more detail, a single KVP includes a "key" which is a unique identifier that is mapped or linked to some item of data, also referred to as the "value" of the pair (and also thereby linked or mapped to the location of such data or "value" of the KVP). A request to perform a data operation to read or write data of a KV data store may use such a "key" of a particular KVP to retrieve the corresponding mapped data item for read operations, perform write operations (e.g., writing data as a "value" referenced or mapped to a particular "key" where the "value" may be a new data value or an update to an existing data value), to perform delete operations (e.g., to erase or delete an existing data item or delete the KVP/both the "key" and "value" from the data store), and the like, as may be supported in connection with the KV data store. KV data stores and associated KVP semantics used to express data operations may also be referred to as "NoSQL" data stores and semantics as a characterization of what such data operations are not. For example, KV data stores and KVP semantics are not SQL-based relational databases.

Figure 2C:
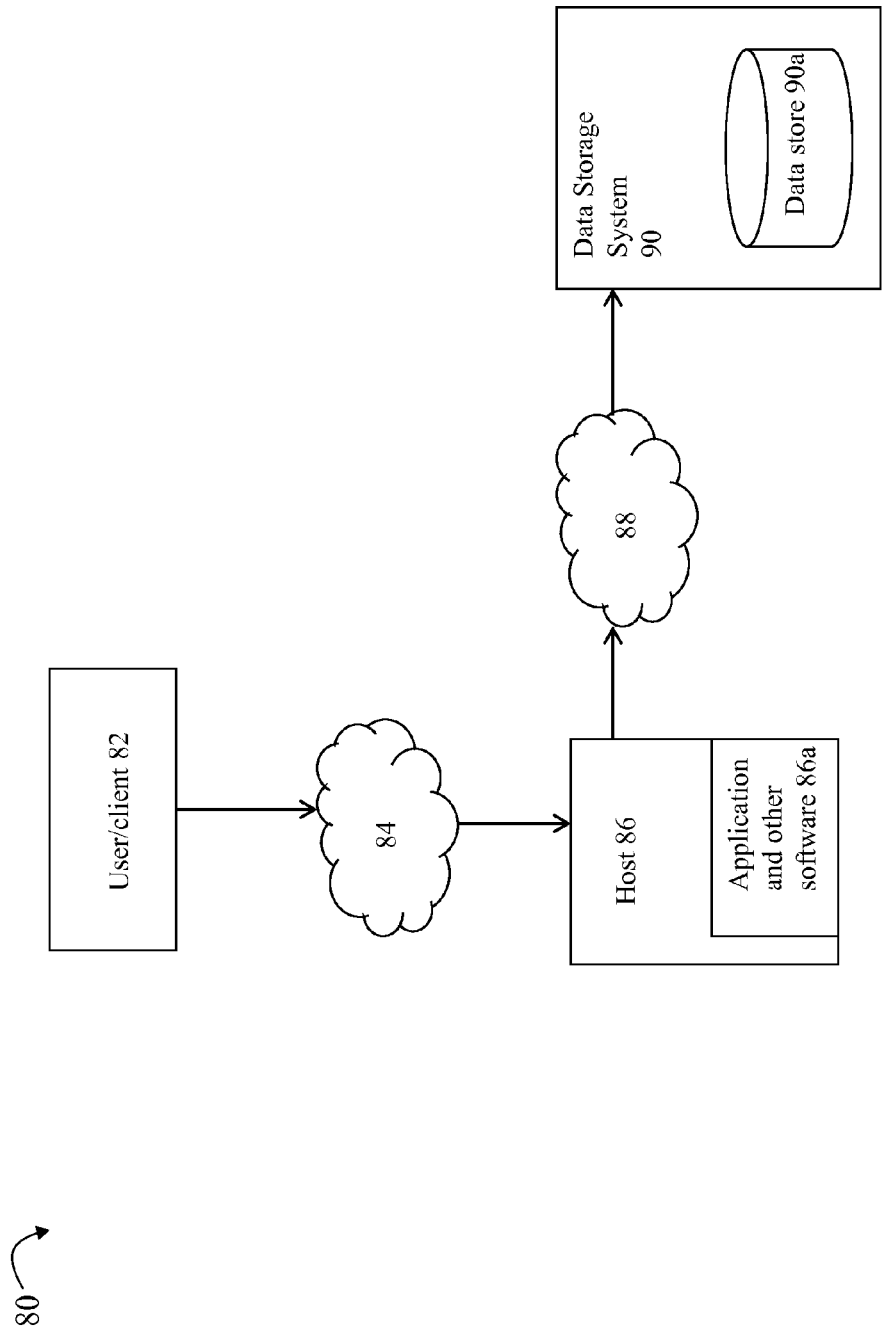

With reference to FIG. 2C, for example, a data store 90a may be included in the data storage system 90. The data store 90a may be a KV data store or other data container having its data stored on the data storage system 90. A user or client 82 may issue a request to an application running on the host 86. The request may be issued by the user/client 82 over network 84 and is received by the host 86. The host 86 may include the application and also other software 86a. The request from user/client 82 to the application may be processed on the host 86 and result in the host 86 issuing a request to the data storage system 90 to perform a data operation on the data store 90a.

Figure 3:
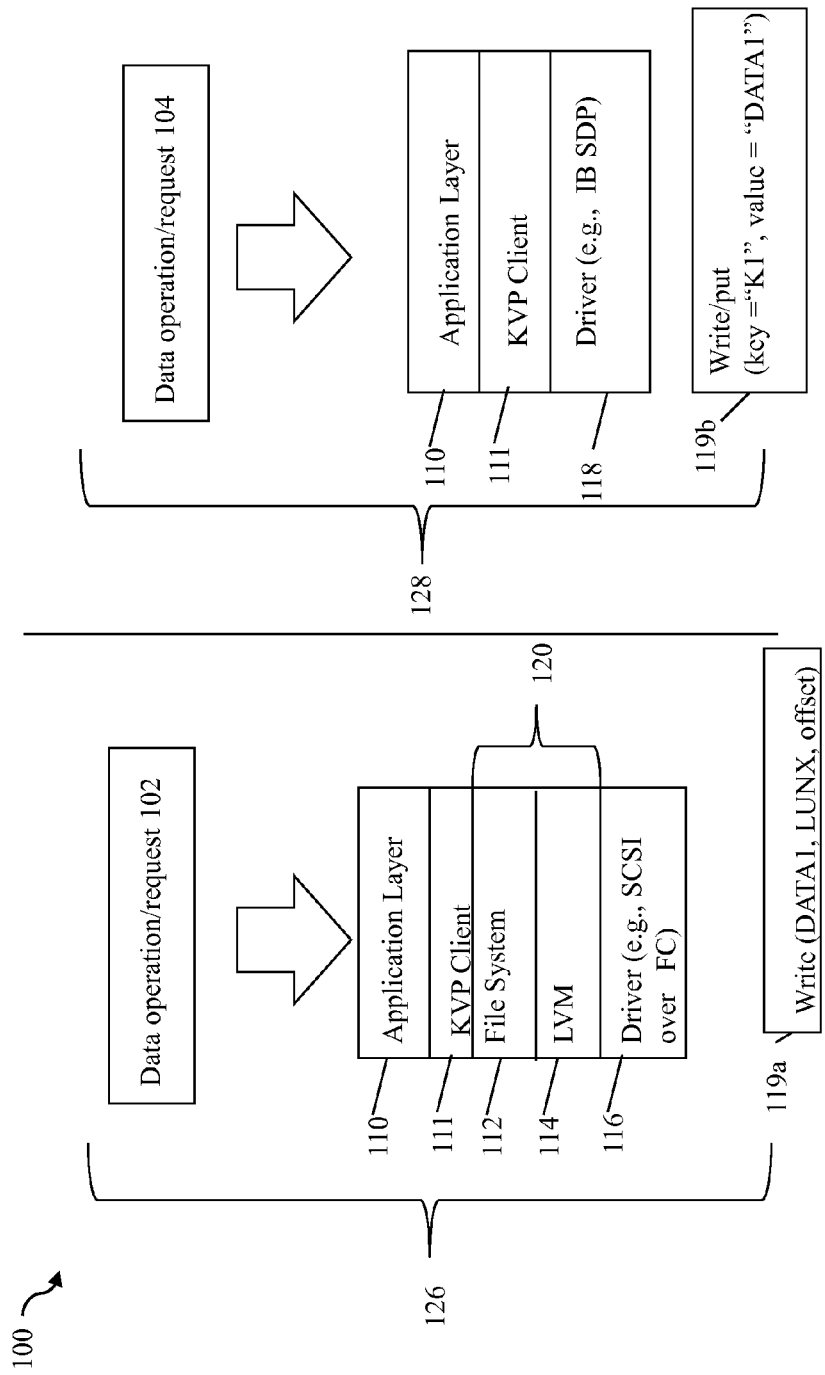
FIG. 3 is an example illustrating processing as may be performed on a host.

With reference to FIG. 3, shown is an example 100 of processing as may be performed in connection with processing a data request 102 without utilizing techniques herein (left side 126 of FIG. 3) and also in connection with processing a data request 104 with utilizing techniques herein (right side 128 of FIG. 3). In a system not utilizing techniques herein, the request 102 to perform the data operation may be received by the host. Elements 110, 111, 112, 114 and 116 illustrate exemplary software layers that may be executed at runtime on the host 86 as part of a runtime stack or I/O path in an embodiment not in accordance with techniques herein to process the request 102 received from the user/client 82 (of FIG. 2C). Application layer 110 may represent the application receiving the request 102 from the user/client 82. The application (as represented by the application layer 110) may communicate with a KVP client 111, the next lower layer in the illustrated stack of 126, using an application programming interface (API) in accordance with a KVP or KV data store protocol. For example, the KVP API or protocol may perform data operations by identifying a "key" of a particular KVP. In this manner, the application layer 110 may translate or map request 102 to a call to the KVP client 111 in accordance with the KVP API or protocol. In a system not utilizing techniques herein as illustrated by 126, the call in accordance with the KVP API or protocol to the KVP client 111 may result in one or more calls to the file system 112. In this manner, the KVP API call (e.g., where a desired data item or "value" of a particular KVP may be referenced by its corresponding "key" in connection with a data operation) may be translated into a file system reference using file system-based semantics (e.g., where data operations may be expressed in terms of a reference to a "file" and an offset or location in the file). The file system layer 112 may communicate with the LVM or logical volume manager 114 by translating or mapping the data operation from one expressed in terms of a file system reference to a logical volume or LUN reference (e.g., LV, offset, or LUN, offset). The current form of the I/O request such as in terms of a LUN and offset may be expressed in terms of a block-based protocol and associated semantics whereby such form is now processed by a driver 116 in accordance with the particular storage and network protocols. For example, the driver 116 may form the appropriate messages such as 119a for issuing the I/O request in accordance with a block-based protocol such as SCSI over FC. In this example, the host may now issue the I/O request as a block-based storage request 119a to the data storage system. The request 119a may perform a put or write operation where the request includes input parameters expressed in terms of a block-based storage protocol including the data "DATA1" to be written to a target location identified by "LUN X" and an "offset" within the LUN X. In this example with 126, the data store 90a of the data storage system 90 of the example 80 of FIG. 2C may have its data stored on one or more LUNs and may be accessed using block-based data operations via the foregoing processing performed on the host. In a similar manner, any data returned from the host may be processed in a reverse order up the call stack illustrated by 126. It should be noted that the host may alternatively provide for issuing the data operation to the data storage system using other block-based protocols or also file-based protocols. Thus, the particular layers included in a host which are processed may vary from that which is described in 126 for illustration. It should be noted that the host-side processing of 126 may include one or more host-side logical device mapping layers. For example, the host may perform processing to map a host-side LV, or other host-side logical device, to one or more LUNs used in connection with providing a block-based request 119a to the data storage system.

With reference now to element 128 of FIG. 3, shown is an example of processing that may be performed in an embodiment in accordance with techniques herein on the host. Element 104 may represent the data operation request from the user/client 82 and may be similar to request 102. The host may include the layers 110, 111 and 118 where elements 110 and 111 are as described in connection with 126 above. In connection with techniques herein, the application layer 110 and the KVP client 111 communicate in accordance with the KVP API and protocol in a manner similar to that as described in connection with element 126. For example, the application layer 110 may issue a request to perform a data operation specified in terms of a "key" (for reads) of a KVP and may also include a corresponding "value" of the KVP as may be appropriate for the particular operation such as write. If the operation is a read, the corresponding "value" of the KVP may be returned as a result of performing the read operation where the "value" is provided as an input parameter. In an embodiment in accordance with techniques herein as illustrated by 128, the data operation in terms of the KVP API and protocol as communicated by from the application layer 110 to the KVP client 111 is not further mapped, translated or processed by a file system layer and/or an LVM layer. In other words, in connection with processing of 128, the application layer request is not further mapped or translated by additional software layers at runtime into equivalent semantics in accordance with a file system-based request and/or a block-based request. Rather, the data operation as expressed in terms of the KVP API and protocol and is now processed by the driver 118 in accordance with the particular protocols as may be used in an embodiment to send the data operation request to the data storage system. In one embodiment, the driver 118 may prepare and send messages for the data operation using SDP (Sockets Direct Protocol) over InfiniBand (IB). Thus, the processing on the host side is reduced in element 128 as compared to 126 by removal of intermediate layers 120. Furthermore, the request 119b sent from the host to the data storage system to perform the data operation preserves/uses the NoSQL KVP semantics of the KVP client 111. For example, the request 119b may perform a put or write operation where the request includes input parameters of a "key"=K1 (where K1 is the particular key of the KVP) and a corresponding "value" or data item of DATA1) in accordance with KVP semantics. In connection with KV data stores and KVP semantics of the data operation requests as described in more detail elsewhere herein, the KV data store and the KVPs used to access such data stores may be unstructured or may not have any particular structure than one as may be interpreted by the application or requesting client.

It should be noted that the application level protocol such as described in connection with the KVP-based protocol and KVP semantics for the KV data store may refer to a protocol at the application level in accordance with the different layers of the OSI (Open Systems Interconnection) Reference Model. The OSI reference model as known in the art generally includes the following 7 layers, from lowest (e.g., Level 1) to highest (Level 7): physical, link, network (e.g., exemplary network level protocols include IP (Internet Protocol) v4, IPv6, and ICMP (Internet Control Message Protocol)), transport (e.g., exemplary transport level protocols include SCSI, TCP (Transmission Control Protocol) and UDP (User Datagram Protocol)), session, presentation, and application (e.g., other exemplary application level protocols include HTTP and FTP). At each level, a variety of different protocols may be utilized and understood by the data storage system and hosts in an embodiment.

Figure 4:
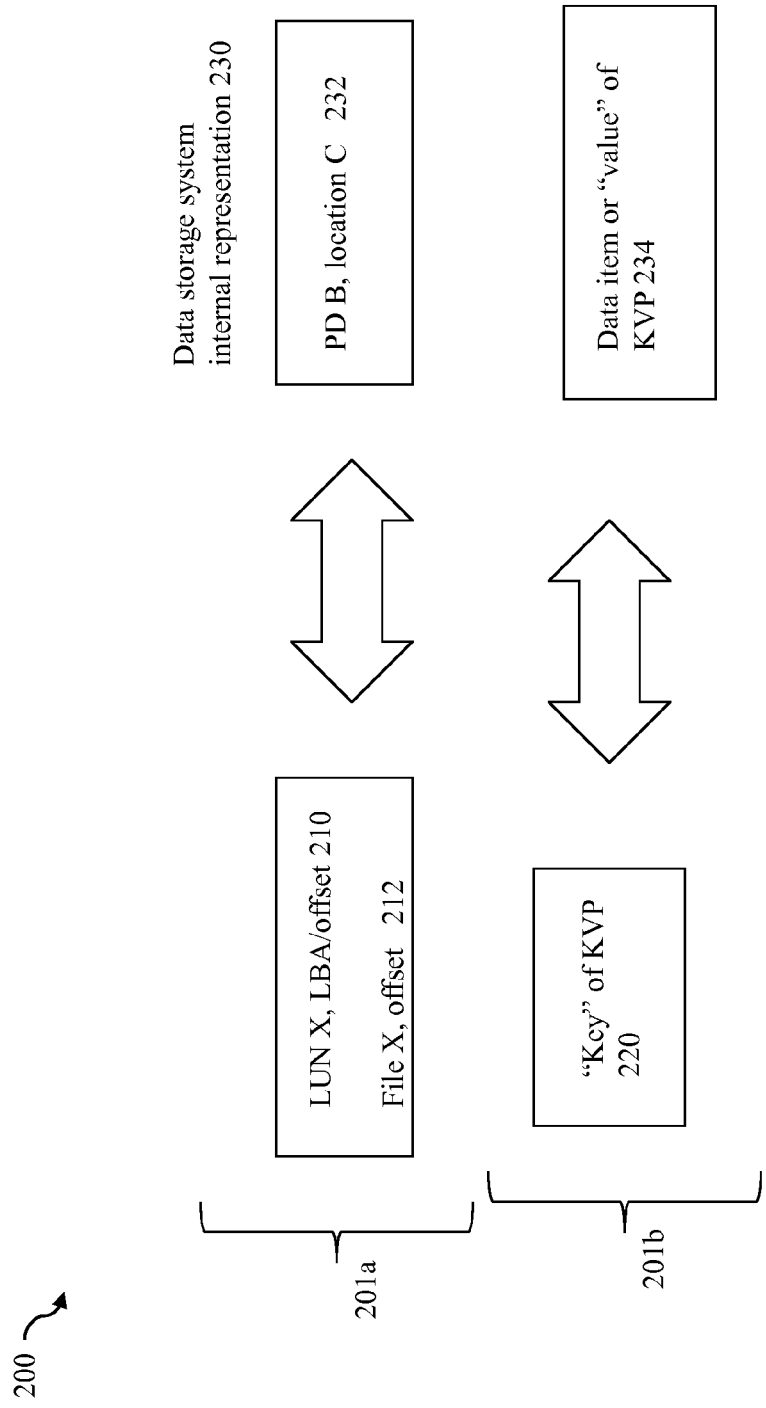
FIG. 4 is an example illustrating processing as may be performed on a data storage system.

Referring to FIG. 4, shown is an example of processing that may be performed on the data storage system side in connection with a received request such as from the host performing processing as illustrated in connection with the variations of FIG. 3. Element 201a illustrates processing that may be performed on the data storage system in connection with a request received from the host such as request 119a not generated in accordance with techniques herein. Element 201b illustrates processing that may be performed on the data storage system in connection with a request received, such as request 119b, generated in accordance with techniques herein having the KVP-based protocol and semantics. Generally, the data storage system performs processing to map or translate a received request into a data storage system internal representation 230. Element 232 illustrates one form of the internal representation as may be used in connection with mapping received a block-based protocol request 210 and/or a file-based protocol request 212 to a physical device (PD, such as PD B in 232) and a location on that PD (e.g., such as denoted by location C in 232). Element 234 illustrates another form of the internal representation as may be used in connection with mapping a received KVP-based protocol request 220 to its corresponding data item or "value". As described in more detail elsewhere herein, processing for mapping 220 to 234 may include mapping a particular "key" of a KVP to a location including the corresponding data item or "value" 234.

Element 201a illustrates that a block-based protocol request 210 or a file-based protocol request 212 received by the data storage system may be mapped to a data storage system internal representation 232. Element 210 represents a request such as 119a. In connection with element 212 for a received file-based protocol request, the data storage system processing may include mapping or translating the file-based request 212 to a block-based request prior to the data storage system internal representation 232.

Element 201b illustrates processing as may be performed by a data storage system in connection with a request in an embodiment in accordance with techniques herein. Element 220 represents a request such as 119b where the "key" of the request 220 is mapped to its corresponding data item or "value" 234 and the location of such data item or "value" to perform the requested data operation on the KVP.

Based on the above, an embodiment in accordance with techniques herein may perform processing such as illustrated in connection with elements 128 of FIG. 3 and 201b of FIG. 4. In such an embodiment, the host processing may be reduced by removing processing performed by intermediate software layers, such as an LVM and/or file system, which map or translate the request in accordance with KVP protocol and semantics to file system and/or block-based semantics. Rather, in accordance with techniques herein, the request in accordance with the KVP protocol and semantics (as received by the KVP client) may be preserved in connection with messages transmitted from the host or client to the data storage system for processing. In this manner, the data storage system may be characterized as understanding and processing received requests in accordance with the KVP protocol, API and semantics. The KVP-based protocol request 119b may be mapped directly into a data storage system internal representation used to identify the associate data item or "value", and location thereof, for a particular KVP having its corresponding "key" in the request 119b. Thus, one of the benefits of an embodiment using the techniques herein (e.g., in accordance with 128 and 201b as compared to processing in accordance with 126 and 201a) is improved performance. As described herein, the processing of the intermediate layers (such as 120 on the host) may be eliminated by having the data storage system understand and process received communications based on the KVP protocol and semantics and having the data storage system directly map or translate the KVP-based semantics to a data storage system internal representation used to determine the location of the requested data item or "value". In this manner, the host or more generally the client, achieves higher performance benefits such as decreased or improved response time.

In embodiments in accordance with techniques herein, the data storage system includes components which understand and process received communications based on the KVP protocol and semantics such as communicated by the application layer to the KVP client. With reference back to the description of FIG. 2A above, for example, the FA of the data storage system may receive communications from application such as executed on the host or other client which includes a data operation request in accordance with the KVP protocol, API and semantics for a particular KVS data store (e.g., to read/get, write/put, delete, etc. and perform any other supported operations on data with respect to the data store). The supported functions, API and particular semantics may vary with the particular KVS data store included in an embodiment. As described above, FA and other components of the data storage system support various protocols and standards. For example, the FA may support one or more block-based protocols (e.g., SCSI, iSCSI, and the like), and/or one or more file-based access protocols (e.g. NTFS). The FA may also support, alone or in combination with other protocols, one or more protocols, such as SDP over Infini-Band, in connection with KVP communications. In this manner, the FA may thereby recognize, understand, send, receive, and interpret communications based on one or more such supported protocols. With reference back to FIGS. 3 and 4, the FA may receive the request (e.g., 119b, 220) in accordance with the KVP protocol and semantics and may perform processing to map or translate the request to the data storage system internal representation 234 thereby identifying the data item or "value" and its associated location based on the "key" of the request uniquely associated with the "value". The DA may then use the data storage system internal representation to access the data item and its location on the physical storage device to perform the requested operation.

Figure 5A:
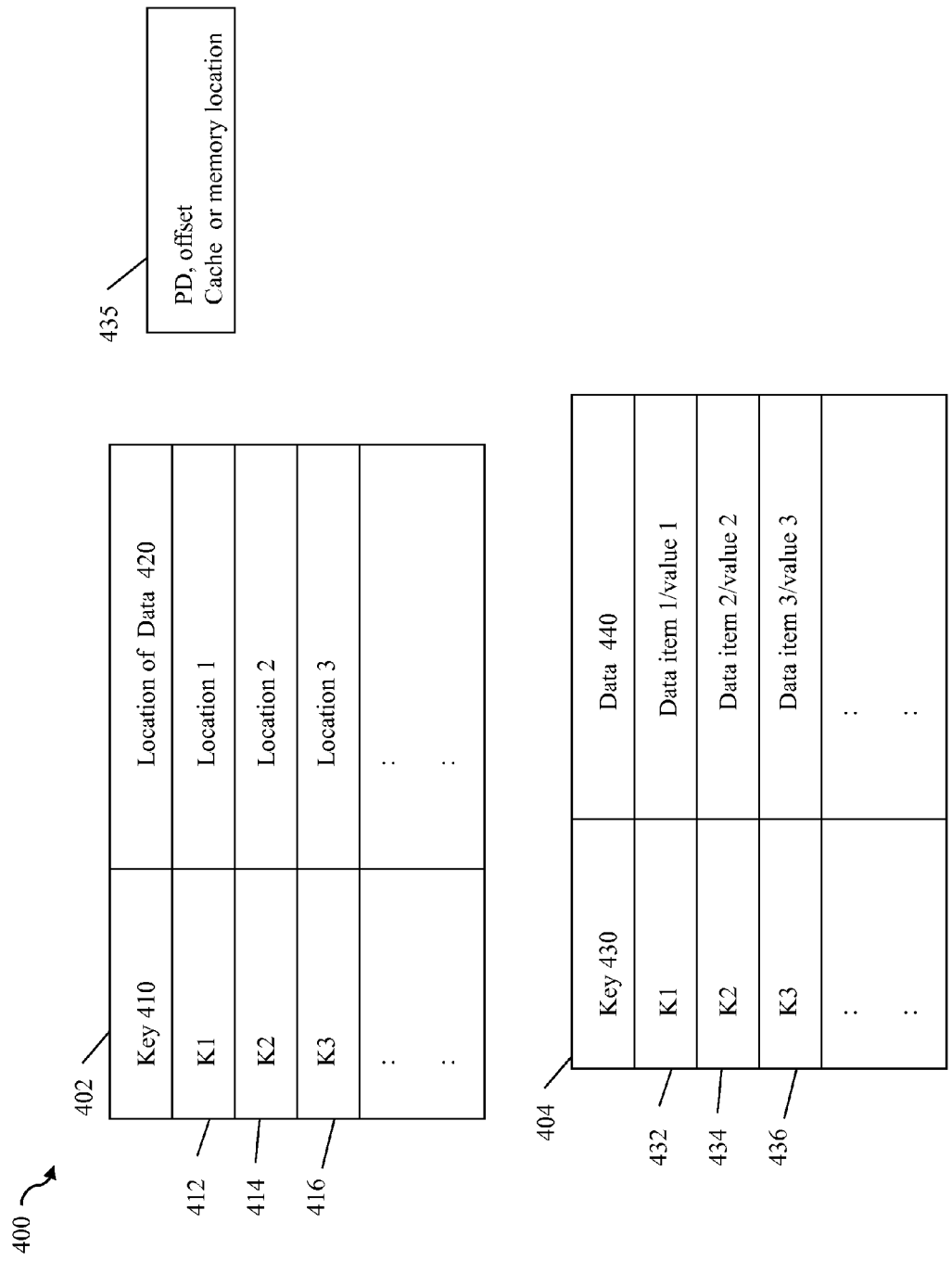
FIGS. 5A, 5B and 5C illustrate mapping tables that may be used in connection with techniques herein with a key-value (KV) data store.

Referring to FIG. 5A, shown is an example 400 of mapping tables that may be used in an embodiment in connection with the techniques herein. The example 400 includes two exemplary instances 402, 404 of mapping tables that may be used in an embodiment in connection with techniques herein. The mapping table may be used, for example, by the FA in connection with performing operations for data of a KV data store whereby such operations use key-value pairs (KVPs). Each of the mapping tables 402,404 may include mappings for one or more unique identifiers that may be specified as keys. For each such instance of a "key" (e.g. 410 of table 402 and 430 of table 404), the mapping table 402, 404 may be used to map the key instance, directly or indirectly, to an associated data item or "value" of a particular KVP. For example, with reference to table 402, the table 402 may include a key column 410 and a location of data column 420. The table 402 may include a row for each KVP. Row 412 includes a first unique key, K1, of column 410 that may be specified as a key instance or key data value in connection with performing a data operation (e.g., read/get, write/put, delete, etc.) on the data store. The data item associated with the key instance K1 may be located at Location 1 as specified in column 420 of the same row. In a similar manner, rows 414 and 416 identify data locations Location 2 and Location 3, respectively, for keys K2 and K3. More generally, as known in the art, each KVP is a set of two linked items—a "key", which a is a unique identifier for some data item, and the "value" associated with that particular key instance, which may be the actual data item itself or a pointer or other identifier used to map the unique "key" instance to the location of the actual data item. Thus, although the column 420 in this exemplary table 402 identifies the location of the data in column 420, the information in column 420 may actually be the data item itself if, for example, the key instance in 410 directly identifies the location or address of the data item. Table 404 is such an example of another mapping table that may be used to directly obtain the corresponding "value" or data item of a KVP given a particular "key". The table 404 includes a column of keys 430 similar to 410 of table 402. Additionally, table 404 includes a row for each KVP in a manner similar to table 402. However, table 404 includes column 440 rather than 420 whereby column 440 includes the actual "value" or data item for a particular "key" of 430 in the same row.

Thus, generally, given a unique identifier as a "key" of a KVP, an embodiment may determine the corresponding data item or "value" for that unique identifier, and its associated location, using a mapping table. The data item or "value" of a KVP may be determined directly using the "key" (e.g., where the "key" directly identifies the address or location of the data item "value" as in table 404) or indirectly (e.g., where the "key" is mapped to the data item "value" via an entry in the table 402 which specifies a location or address of the data item "value" as in table 402). In connection with the mapping tables that may be used in an embodiment, it should be further noted that although the information in column 420 of table 402 may include the address or physical location at which the associated data item (e.g., "value" portion of the KVP) is located, column 420 may not directly identify an address or physical location for the associated data item (e.g., "value" portion of the KVP) but may rather identify yet another intermediate value further used to map to the address or physical location including the associated data item. In this manner, given a particular "key", the mapping table may be more generally used to obtain the data item or "value" directly or indirectly through one or more levels.

In an embodiment using table 402 where the column 420 specifies the location or the data or a pointer to the data, the location may be specified in any suitable manner depending on the particular device, cache, memory, and the like, which contains the data item or "value" of the KVP. Element 435 illustrates that the location of the data item as may be specified in an entry of column 420 may be represents as a physical device (PD) and offset on that PD, a location or address in cache or memory, and the like.

In one embodiment, the data items or "values" of the KVPs may be stored in a form of fast memory. For example, the data items or "values" may be initially stored in a form of fast memory that does not persistently store data, such as DRAM, which is then moved or stored in a form of persistent fast memory, such as a flash-based memory, a solid state memory or device, or any other suitable form of fast memory known in the art. In one embodiment as described elsewhere herein in more detail, the data items or "values" of KVPs for the KV data store may be stored in a flash-based storage tier of physical storage connected directly to the fabric. In this manner, the "values" of KVPs of the KV data store may be directly accessed using a direct data placement protocol. The tables, such as 402, 404 used in connection with techniques herein, may be characterized as a form of metadata and may also be stored in memory or cache of the data storage system such as, for example cache included in global memory 25b of FIG. 2A. In connection with the KV data stores, any/all of the data services as may be performed in connection with other data of the data storage system may also be used in connection with the KV data stores. For example, by having the data storage system include a KV data store, the data services, such as data replication, backup, restoration, mirroring (e.g., providing a redundant or duplicate copy of data in the same local storage system), remote mirroring (e.g., where a mirrored copy may be maintained on another data storage system such as another data storage array), migration, RDF (for automated remote data replication), data de-duplication, and the like, may also be performed with respect to data of the KV data store. Thus, the KV data store may be protected on a variety of different ways using such data services. It should be noted that embodiment may utilize such data services by having software implementing such services directly understand semantics of KVPs used with a KV data store. Alternatively, an embodiment may map KVP and KV data store semantics to another form in accordance with other semantics understood by the software implementing the desired service(s).

Figure 5B:
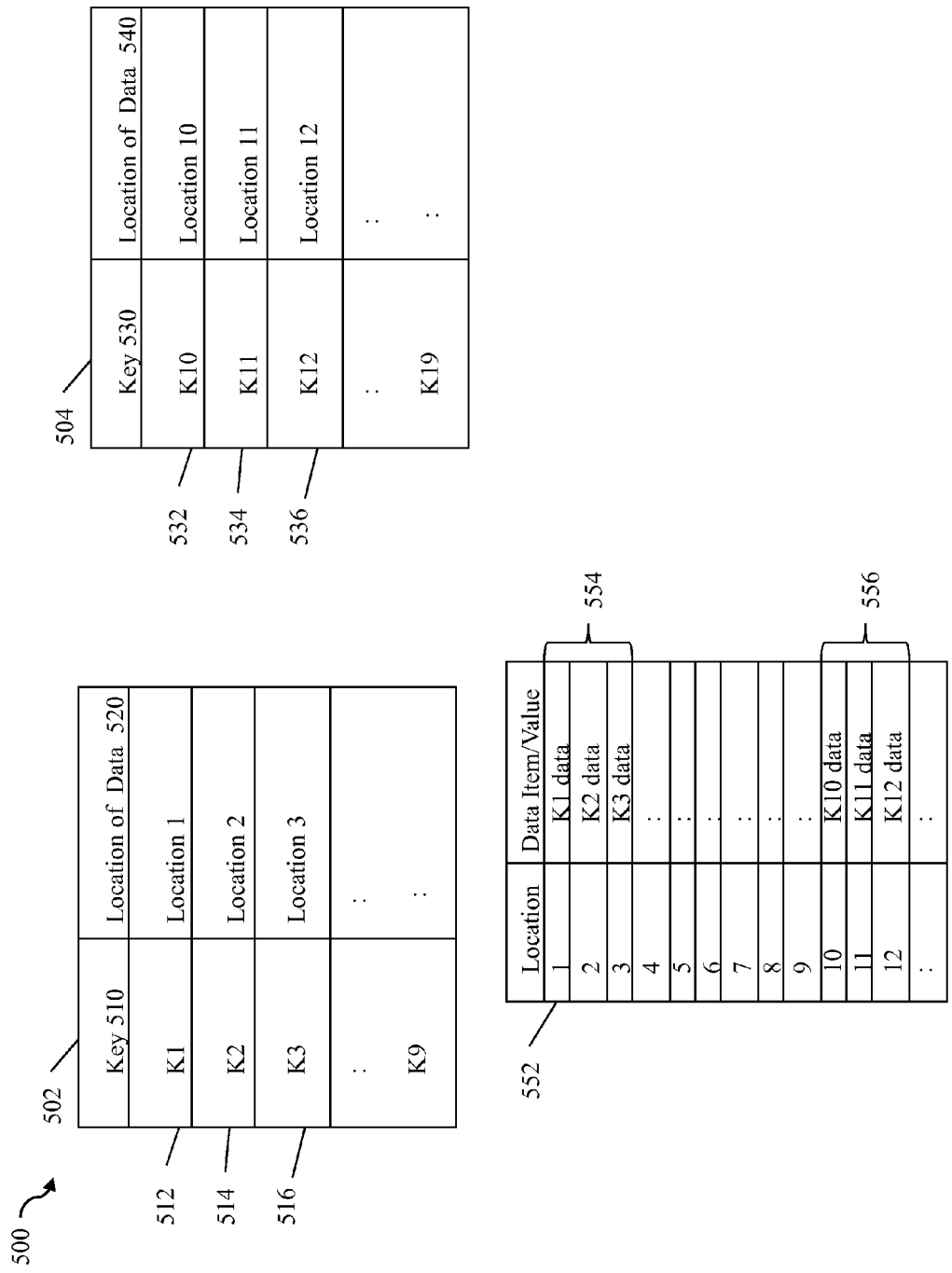

The techniques herein may use the tables in connection with implementing application-based or policy-based decisions regarding where (e.g., what physical storage and locations) to store the data items (e.g., values) of the KVPs for certain keys, or ranges of keys, that may be specified in connection with data operations from the host. For example, reference is made to FIG. 5B. In the example 500, illustrated are two tables 502, 504. Tables 502 and 504 are similar to table 402 of FIG. 5A described elsewhere herein. The table 502 may be used to map a range or portion of key instances K1-K9 as indicated in column 510. Column 520 may indicate the locations of the data items or "values" for the corresponding keys K1-K9. As described above, each row of table 502 corresponds to a different KVP having its "key" identified in column 510 and the location of the "value" or data item identified in column 520.

The table 504 may be used to map a range or portion of key instances K10-K19 as indicated in column 530. Column 540 may indicate the locations of the data items or "values" for the corresponding keys K10-K19. As described above, each row of table 504 corresponds to a different KVP having its "key" identified in column 530 and the location of the "value" or data item identified in column 540. At a first point in time, the data storage system may use tables 502 and 504 to map the "values" corresponding to keys K1-K19 in locations of a particular portion of storage 552 such as cache or a form of permanent storage, such as fast-memory or flash-based memory. For example, element 554 represents the locations in the storage 552 at which data items or "values" for keys K1-K3 (denoted in rows 512, 514 and 516 of table 502) are stored. Element 556 represents the locations in the storage 552 at which data items or "values" for keys K10-K12 (denoted in rows 532, 534 and 536 of table 504) are stored. Tables 502, 504 may define the mapping of where data is stored for particular key ranges of keys at a particular time of the day in accordance with a defined policy of the data storage system. For example, storage 552 may be a fast memory or cache (e.g., flash-based memory or solid state memory) and during daytime or working hours (e.g., 8 a.m.-6 p.m. Monday through Friday, inclusively), the data items associated with the keys K1-K19 may be stored in the fast memory or cache 552. A policy may be defined which indicates that all other times are off-peak hours.

Figure 5C:
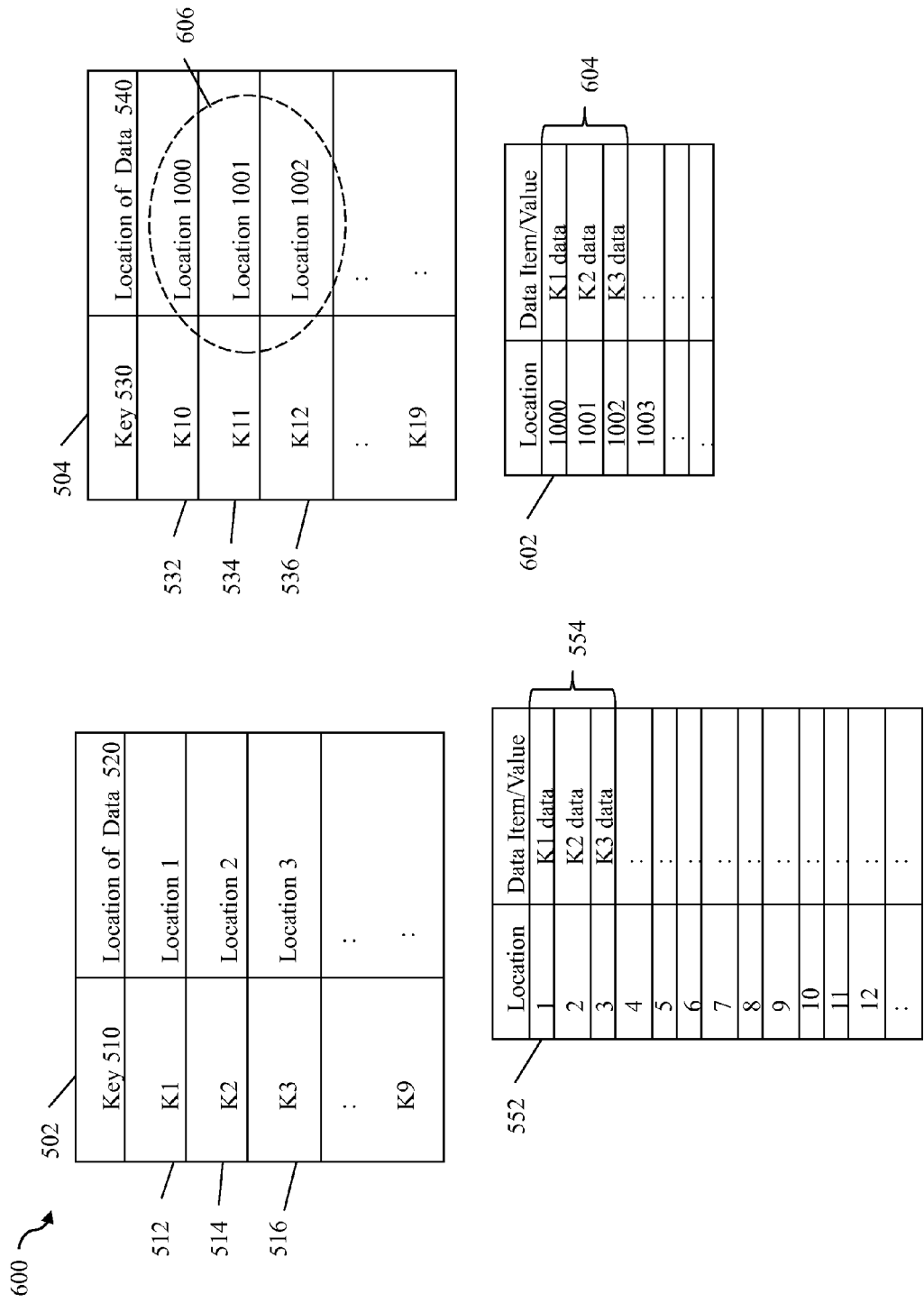

With reference now to FIG. 5C, during the off-peak hours, data items or "values" of the KV data store associated with keys K10-K19 may be stored on another storage device 602 having a lower performance characteristic than the storage 552. For example, 602 may represent a physical storage device such as a rotating disk drive. However, the policy may also specify that the data items or "values" of the KV data store associated with keys K1-K9 are still required to be stored in the fast memory or cache 552 during the off-peak hours. The example 600 illustrates the mappings during the off-peak hours based on this policy where the mapping table 504 may be updated to map the data items or "values" for keys K10-K19 to the storage device 602. Element 606 represents updated entries in rows 532, 534 and 536 (e.g., respectively for keys K10-K12) of table 504. Element 604 represents the locations in the storage 602 at which data items or "values" for keys K10-K12 are stored during off-peak hours or more generally when the associate data items or "values" are not in high demand/associated with a high workload, for example, as may be compared to other data items or "values" associated with other unique "keys".

The foregoing is one example of how the mapping tables may be used and updated in accordance with different data storage system policies and applications with KV data stores. As will be appreciated by those skilled in the art, the mapping tables may be updated in connection with any suitable use to locate and/or relocate data items or "values" associated with particular "keys" in one or more different forms of physical storage (e.g., storage devices, cache and/or memory). As another example, a data storage system may process operations in connection with KV data stores as well as other data stores, such as those having data accessed using block-based protocols (e.g., read and/or write operations which identify a location of data by specifying a LUN and offset or logical address within the LUN), file-based protocols, and the like. In this case, it may be desirable to store the data of the KV data store in the highest performing storage available on the data storage system such as cache or a flash-based memory or SSD. Data for the other non-KV data stores (which may be accessed using a blocked-based or file-based protocol other than those specifying KVPs) may be stored in any remaining physical devices not designated for use with storing data from the KV data stores. Thus, the highest performing memory and/or storage devices of the system may be first used to store the data items of the KV data store prior to other data items thereby providing the KV data store priority over other such data. For example, if there is only enough flash-based storage to store the data of the KV data store, then all other data may be stored on lower/slower performing storage devices, such as rotating disk drives. The mapping tables used in connection with the KV data store as well as other mapping tables used in connection with mapping LUN addresses to physical device locations (e.g., as used for block-based and/or file-based data operations) may contain the appropriate information to implement the foregoing.

Figure 6:
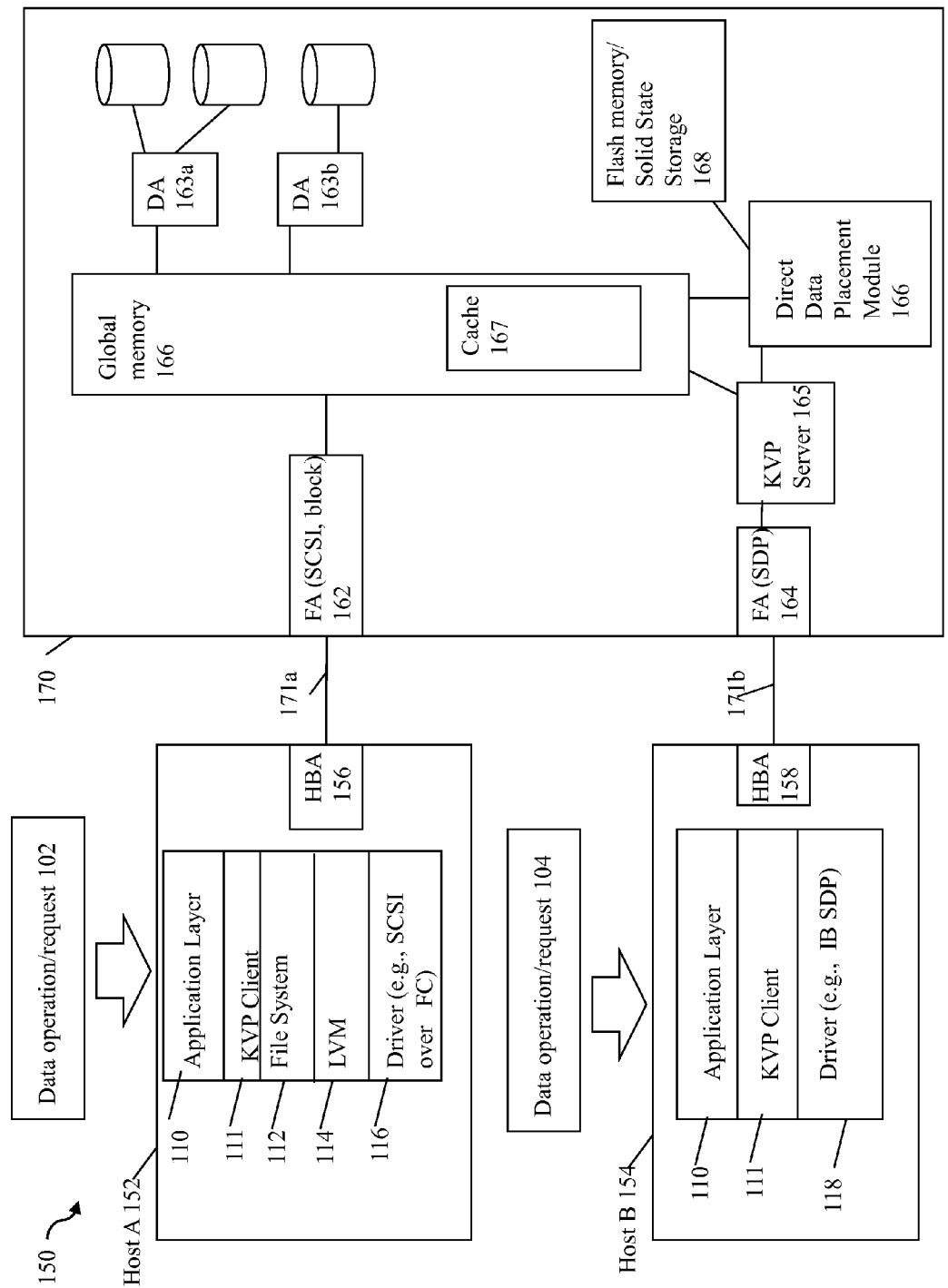
FIG. 6 is an example illustrating components and data flows as may be performed in an embodiment in accordance with techniques herein.

Referring to FIG. 6, shown is an example illustrating data flow in a system and network in an embodiment in accordance with techniques herein. The example 150 includes a first host A 152, a second host B 154, data storage system 170. The lines 171a, 171b connecting 152, 154 and 170 may represent network or other communication connections between the components. Host A 152 may include software and perform processing in connection with a data operation/request 102 as described in connection with 126 of FIG. 3. An application (such as a database or data store application at application layer 110) on host 152 may receive 102 from a user or client of the application. As a result of host processing by layers 110, 111, 112, 114 and 116, the host may issue a data operation request as a block-based protocol request over connection 171a to the data storage system 170. For example, the host A 152 may issue a data operation request for a read or write operation as a SCSI block-based request (e.g., such as request 119a) from an initiator port of HBA (host bus adapter) 156 to a target port of the FA 162 of the data storage system 170.

Host B 154 may include software and perform processing in connection with a data operation/request 104 as described in connection with 128 of FIG. 3. An application (such as a database or data store application at application layer 110) on host 154 may receive 104 from a user or client of the application. As a result of host processing by layers 110, 111, and 118, the host B 154 may issue a data operation request as a KVP-based protocol request (e.g., such as 119b) to the data storage system 170 over connection 171b. For example, the host B 154 may issue a data operation request for a read or write operation as a KVP-based protocol request from a port of HBA 158 to a port of the FA 164 of the data storage system 170.

The data storage system 170 may include various hardware and software components mapping tables, and the like, as described elsewhere herein. For example, the data storage system 170 may include FAs, DAs, and the like, such as described in connection with FIGS. 1, 2A, 4, and 5A-5C. With reference to the block-based request such as 119a from host A 152 as received at FA 162, the data flow may then include the FA 162 processing the request, and storing information about the request, as may be needed, in global memory 166 or cache 167. It may be, for example, the request may be a read and the data may be serviced using data already stored in cache. If the request is a write request, depending in the particular data storage system 170, the write request and write data may be stored in cache 167, marked as write pending (WP) and written out or destaged to a physical storage device at a later point in time be the appropriate one of the DAs 163a, 163b. Thus the DA may then retrieve and further service any request stored in global memory 166 or cache 170. As another example, the received request may be a read request. If the read data is not stored in cache, the FA may store a read request for the data in global memory 166 or cache 167. At a later point in time, one of the DAs retrieves the read request, obtains the data from the physical storage device, and stores the read data in cache. The FA may then obtain the requested read data from the cache and return the data to the requesting host.

With reference to the KVP-based protocol request such as 119b from host B 154 as received at FA 164, the data flow may then include the FA 164 processing the request, and storing information about the request, as may be needed, in cache 167 of global memory 166. In this illustrated embodiment, code for servicing the KVP-based protocol request may be performed by a KVP or KV server 165. In one embodiment, the KVP server code 165 may be executing on the FA 164. The KVP server code 165 may perform any needed mapping as described herein by accessing mapping tables stored in cache 167 of global memory 166. To perform the requested data operation (e.g., to read and/or write data), the KVP server 165 may communicate with a direct data placement module 166. The module 166 may operate in accordance with a protocol such as RDMA (Remote Data Memory Access) to read and/or write data (e.g., values of KVPs of the KV data store) from flash memory or solid state storage 168 directly connected to the fabric. The host may also be directly connected to the fabric to facilitate transfer of such data between the flash-based memory 168 and the host for requested read and/or write operations using the RDMA protocol.

Generally, any data returned to a requesting host 152, 154 may be returned along the reverse path through the receiving FA 162, 164 of the data storage system 170.

What will now be described is another embodiment and further variation to that as described above where the data storage system, or more generally the data storage system platform, provides the data storage for the KV and other data stores, services data operations in connection with such stored data, and provides data services such as for data protection and the like. In this further embodiment, the data storage system platform may also include additional computation nodes or processors with the platform where one or more such computation nodes or processors may perform processing as described herein for the host B 154 and/or host A 152. Such an embodiment may provide for even more enhanced performance.

Figure 7:
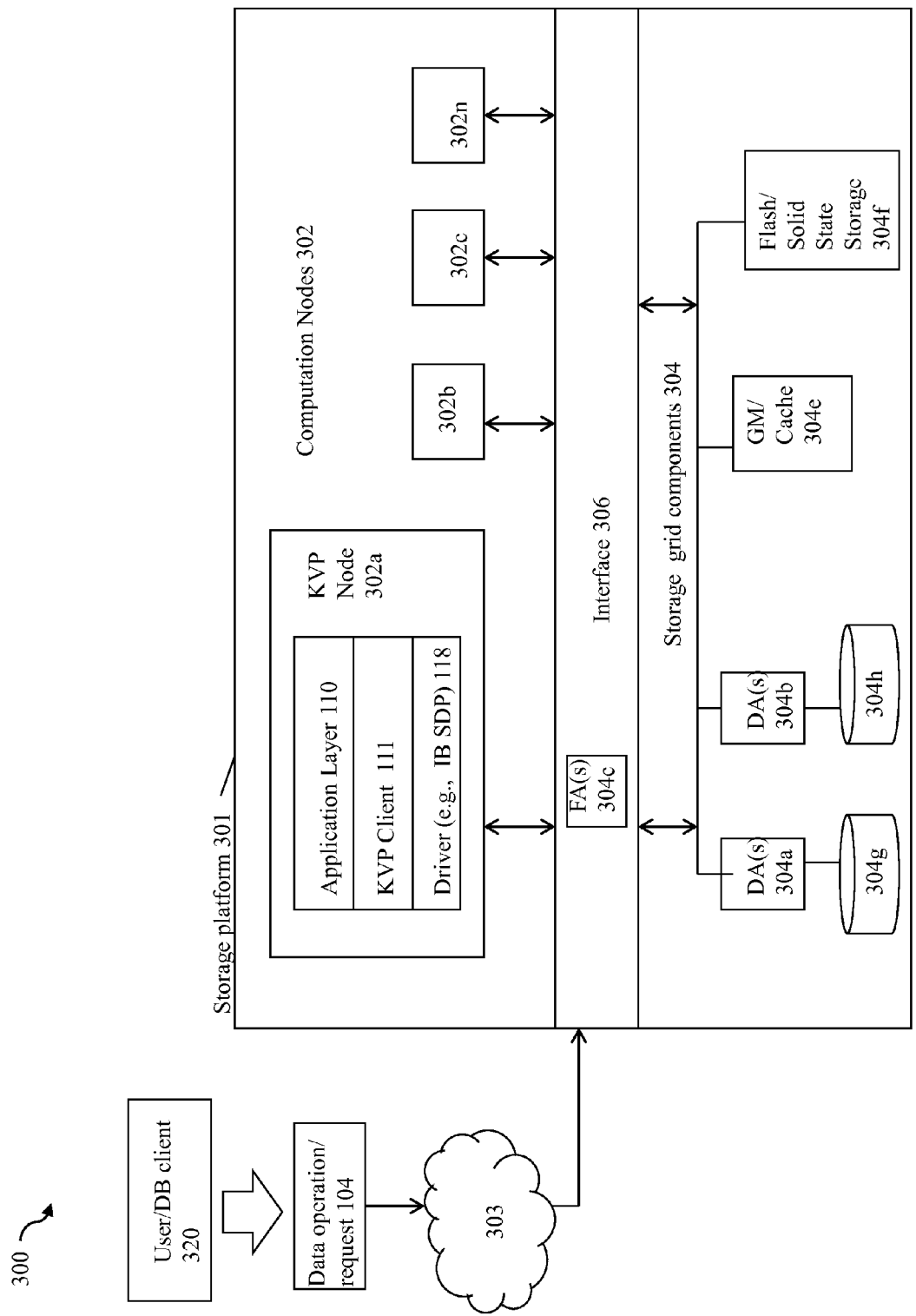
FIG. 7 is an example of a storage platform that may be used in an embodiment in accordance with techniques herein.

Referring to FIG. 7, shown is an example of a network and components that may be used in connection with an embodiment of the techniques described herein. The example 300 includes a networked storage platform 301, a user or database (DB) client 320 and a network 303. The client 320 may issue request 104 to perform a data operation in connection with a KV data store as described elsewhere herein. However, in this example, the request 104 is issued directly to the storage platform 301 rather than a host or server. The storage platform 301 includes an interface 306, storage grid components 304, and computation nodes 302 (denoted 302a-302n). The interface 306 may include the FAs 304c such as described elsewhere herein for use in connection with external communications such as over network 303. Additionally, the FAs 304c and, more generally components in the interface 306, may also be used in connection with communications between the computation nodes 302 and the storage grid and its components 304. The storage grid components 304 may include other components of the data storage system, for example, as illustrated in element 170 of FIG. 6. For example, the storage grid components may include one or more DAs 304a, 304b, global memory and/or cache 304e, flash or solid state storage/memory 304f, and other storage devices 304g, 304h which may be rotating disk drives and/or solid state storage devices such as in a data storage system having multiple storage tiers of different performance classifications whereby each such storage tier may include a different type of physical drive. For example, a system may have three storage tiers—a first storage tier of flash or solid state storage devices, a second storage tier of FC rotating disk drives, and a third storage tier of SATA rotating disk drives.

The interface 306 may also include other hardware and/or software performing other "front end" data storage system functionality as known in the art and described herein. The interface 306, such as through the FAs 304c and/or other components, may support block level storage protocols (e.g., SCSI), file level protocols (e.g., NFS), protocols in connection with KV data stores (e.g. using KVPs), and the like. Additionally, the interface 306 may be configured to process non-protocol commands including those that may identify storage locations/addresses at a block level, using the KVPs, and the like. The interface 306 may perform processing in connection with techniques herein using the mapping tables in connection with KV data stores to map a "key" to its corresponding storage location and/or data item or "value".

The storage grid components are operative to maintain and protect data, e.g., data that is utilized by applications including but not limited to applications run by the computation nodes. Each computation node may run one or more applications which are selected and loaded by a subscriber or owner/operator of the storage platform. The applications may also be removed by the subscriber or owner/operator, e.g., for replacement with other applications. An interface 306 may provide for direct communications between the computation nodes 302 and storage grid components 304 and may also facilitate external communications such as over network 303. The interface 306 may allow I/O operations to be performed in support of the applications executing on the computation nodes 302. The storage grid and computation nodes may be, but are not necessarily, located within a single chassis. A physical part of the interface 306 may include busses, backplanes and switching fabrics that enable fast and wide data transfer. Consequently, the platform 301 may be a fully functional network storage platform in which a buyer can load and remove their own applications.

In the example 300, the computational node 302a may be configured to run code previously illustrated on the host B 154 of FIG. 6. in connection with a database application used to access a KV data store of the data storage system. The KV data store may have its data stored and protected on storage of the 304. In one embodiment, the mapping tables such as illustrated in connection with FIGS. 5A-5C may be stored in some form of fast memory such as cache 304e. The data items or "values" of the KVPs of the KV data store may be stored in flash memory, or more generally, a form of fast memory such as solid state storage 304f. Additionally, the data items or "values" of the KV data store may be stored in flash storage 304f which is directly accessible to the computation nodes 302 over interface 306. The computation nodes 302 may communicate the components of 304 via interface 306 using a standardized protocol, such as SCSI commands, as well as non-standardized protocols. In connection with techniques herein, the computation node 302a (as well as other ones of the nodes 302) may utilize a direct data placement protocol such as RDMA (Remote Direct Memory Access) to access and store data, mapping tables, and the like, that may be stored in the cache 304e and flash/solid state storage 304f for use in connection with performing data operations of the KV data store as described herein.

In the embodiment illustrated in 300, the user/DB client 320 may issue its data operation request 104 to the computation node 302a rather than issue the request 104 to a host or server, such as previously described in connection with FIG. 3. In this manner, the computation node 302a may include the database application (e.g., application layer 110) and other components 111 and 118 for processing the data request rather than have such processing performed by a host thereby possibly reducing or eliminating the need for such a host. Additionally, request 104 from the client 320 may be experience high performance in such an embodiment of the example 300. The latency associated with requested data operations of the KV data store, such as in connection with processing request 104, may be greatly reduced, for example, due to the use of particular protocols, such as RDMA, and due to the tight coupling and close proximity of the computation nodes 302 and storage grid components 304.

Another one of the computation nodes, such as 302b, may be similarly configured to perform processing such as previously described in connection with host A 152 of FIG. 6 and element 126 of FIG. 3.

It should be noted that each of the computation nodes 302a-302n may be associated with one or more processors. Alternatively, each computation node may be associated with a separate virtual machine or virtual device which shares resource of one or more hardware devices. Virtual machines are known in the art and commercially available such as using virtualization software produced by VMware, Inc.

Figure 7A:
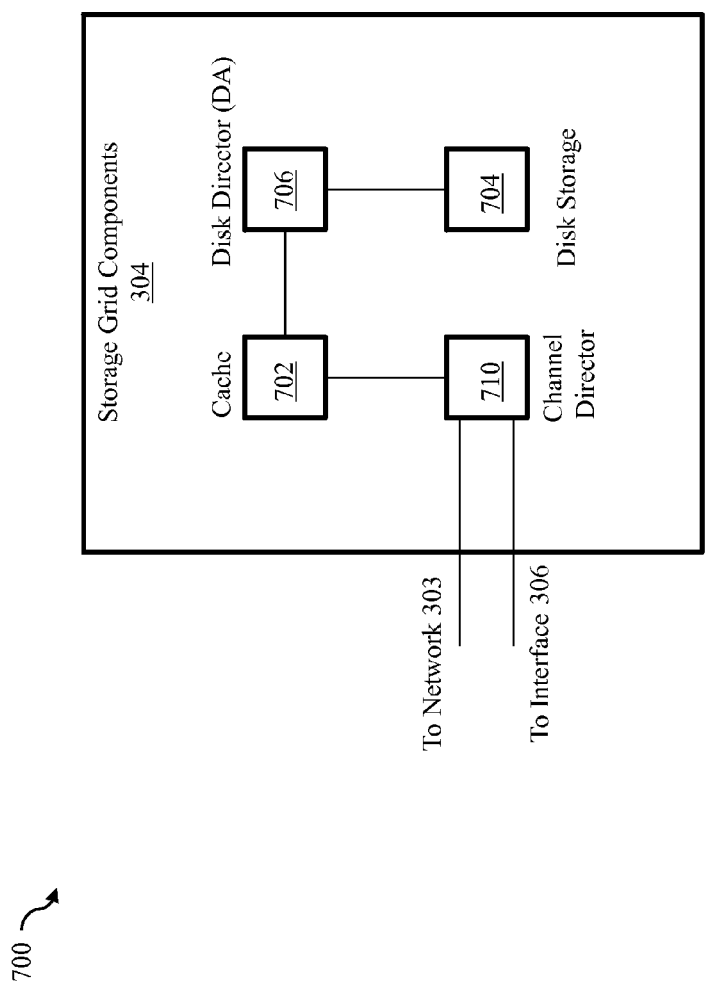
FIGS. 7A and 7B are examples providing additional detail regarding aspects of the storage platform of FIG. 7.

FIG. 7A illustrates an embodiment of the storage platform in which the interface provides the computation nodes with access to a channel director 710 of the storage grid components 304. Basic I/O operations include Read and Write operations. A Read Hit occurs when all data necessary to satisfy an I/O request is in cache 702 (global memory). In this case the channel director transfers the requested data from the cache to the computation node via interface 306, or to the user via network 303. A Read Miss occurs when the data necessary to satisfy an I/O request is not in the cache 702. In this case the data must be retrieved from disk storage 704 so a disk director (DA) 706 reads the blocks containing the data from the disks or other devices associated with disk storage and transfers the data to the cache 702. The channel director 710 then transfers the requested data from the cache to the computation node via interface 306, or to the user via network 303. The computation nodes may communicate with the channel director using a standardized protocol, e.g., SCSI commands, or a non-standardized protocol.

Figure 7B:
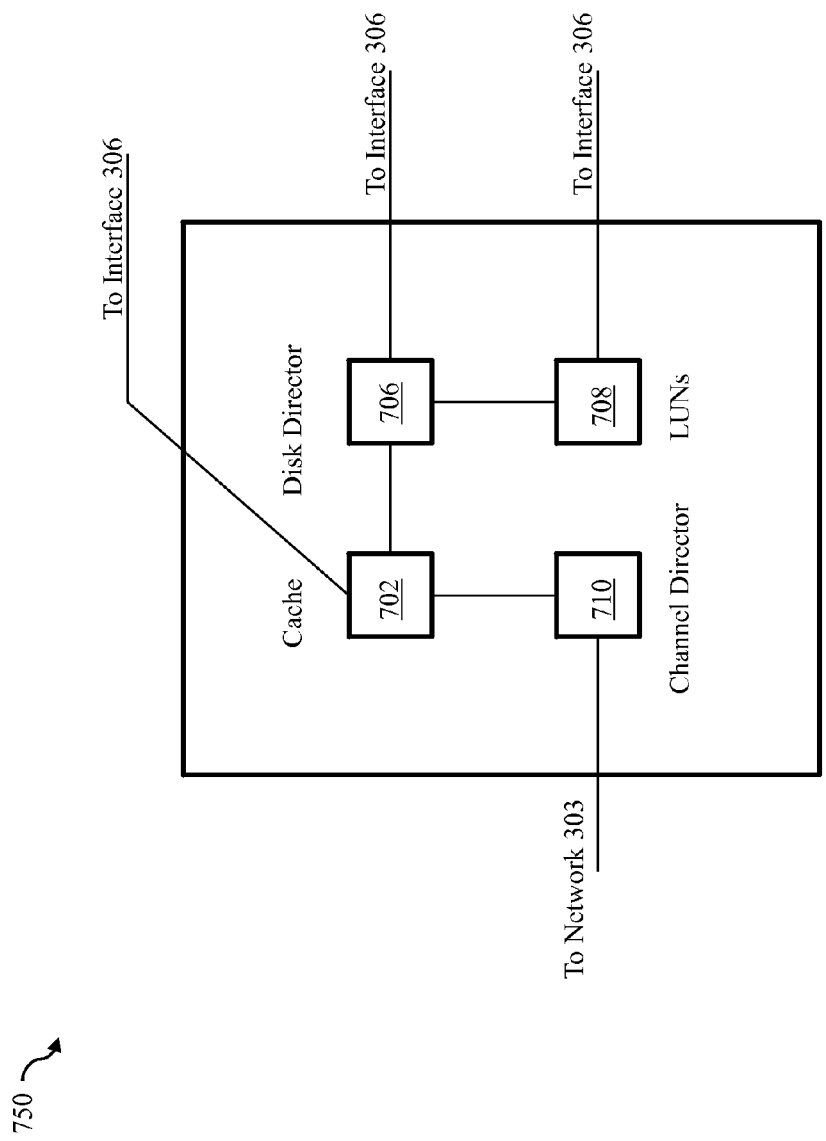

FIG. 7B illustrates another embodiment of the storage platform. In this embodiment the computation nodes may utilize the interface 306 to directly communicate with one or more of the cache 702, disk director (DA) 706 and LUNs 708, where each LUN is a logical unit number referring to a logical storage device that may be associated with one or more physical devices of disk storage 704 (FIG. 7A). The computation nodes may communicate with the cache 702, disk director 706 and LUNs 708 via the interface 306 using a standardized protocol, e.g., SCSI commands, or a non-standardized protocol. In one embodiment as described elsewhere herein, the computation nodes can utilize a direct data placement protocol such as RDMA to perform I/O operations with better speed than other standardized protocols.

Figure 8:
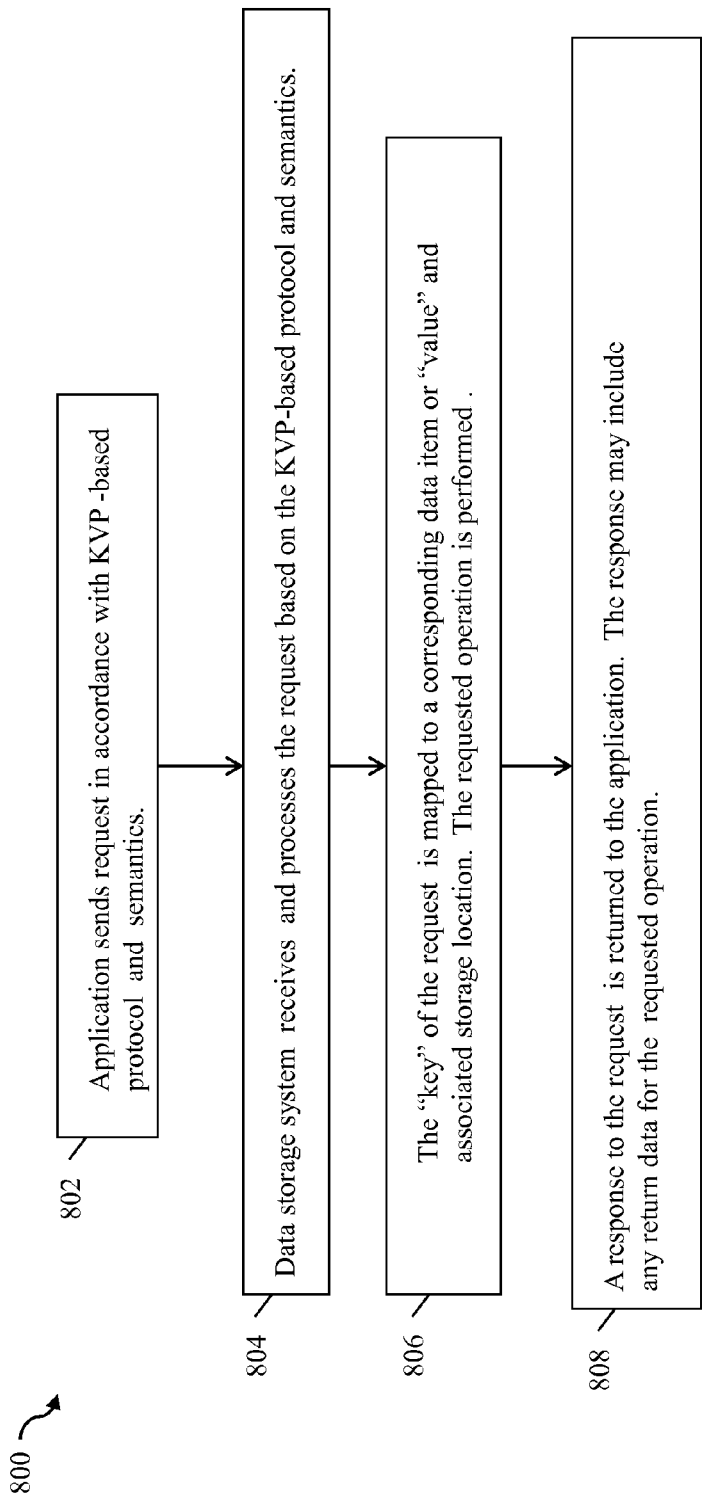
FIG. 8 is a flowchart of processing as may be performed in an embodiment in accordance with techniques herein.

Referring to FIG. 8, shown is a flowchart of processing that may be performed in an embodiment in accordance with techniques herein. The flowchart 800 summarizes high level processing as described above. At step 802, an application, such as executing on a host or computation node, sends a request in accordance with a KVP-based protocol and semantics where the request is to perform an operation on a KV data store. At step 804, the data storage system receives the request from the application. In an embodiment in which the application executes on the host, the request may be received from such a host in step 804. In an embodiment where the application is executing on a computation node of the data storage system such as in connection with FIG. 6, the request may be received by the interface. In step 806, the "key" of the request is mapped to a corresponding data item or "value" and associated storage location and the requested operation is performed. In step 808, a response is returned to the requesting application. The response may include any return data for the requested operation (e.g., if the requested operation is a read or get operation to obtain the data item or "value" for a particular KVP). Additional details regarding the processing performed for each of the steps may be as described elsewhere herein.

An embodiment in accordance with techniques herein may include functionality to perform processing on the data storage system, such as a data storage array or data storage platform described herein, for different data management strategies and semantics. In embodiments not utilizing techniques herein, such processing may be performed on the host or other entity sending a request to the data storage system. In contrast, techniques herein provide for the option of incorporating such processing within code of the data storage system. For example, an embodiment of the data storage system in accordance with techniques herein may include code for implementing application level semantics for different data management strategies such as container strategies, locking strategies and branching strategies. As known in the art, container strategies may relate to container-specific processing or semantics where a container may be characterized as an abstraction built on top of/using the keys and values of one or more KV data store. Locking strategies may relate to semantics of implicit and/or explicit data locking as may be performed in connection with different data values of KVPs. Branching strategies may relate to semantics of additional processing performed based on particular data values and/or key values. As another example, with reference back to FIG. 3 and element 126, an embodiment not utilizing techniques herein may including functionality for a map/reduce software layer in the runtime stack or I/O path of layers 120 (e.g., a layer beneath 111 in the stack). In connection with techniques herein, such processing may be performed on the data storage system rather than on the host. As known in the art, processing as may be performed by a map/reduce software layer may be in accordance with the map/reduce programming model and an associated implementation for processing and generating large data sets. A mapping function may be specified that processes KVPs in one data domain to generate a set of intermediate KVPs in a second different data domain (e.g., Map(k1,v1)→list(k2,v2) where Map is applied to every pair in the input dataset producing a list of pairs for each call). Subsequently, a reduce function may be utilized that then merges all intermediate values associated with the same intermediate key thereby collecting all pairs with the same intermediate key from all lists and groups them together to create one group for each one of the different generated keys (e.g., Reduce (k2, list (v2))→list(v3)). As will be appreciated by those skilled in the art, the foregoing processing may be performed in connection with KVPs for a KV data store for many real world applications.

It should be noted that an embodiment may use the techniques described, for example, in U.S. patent application Ser. No. 13/537,614, filed Jun. 29, 2012, SPLIT TARGET DATA TRANSFER, Kornfeld et al., which is incorporated by reference herein, such as in connection with performing data transfers (e.g., direct data transfers) between the data storage system and a host or other client.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data operations comprising:
sending a request from an application to perform a data operation on a key-value data store, the request being in accordance with a first application-level protocol for performing the data operation on the key-value data store and including a first key of a first key-value pair used by a data storage system to perform the data operation;
receiving the request at the data storage system, wherein the request is received by a key-value server that processes requests in accordance with the first application-level protocol for the key-value data store;
performing first processing on the data storage system to perform the data operation in response to receiving the request at the data storage system, wherein said first processing uses a mapping table to map the first key to a first value that is a first data item corresponding to the first key, wherein the mapping table includes a plurality of entries for a plurality of key-value pairs including the first key-value pair, wherein each of the plurality of entries corresponds to an associated one of the plurality of key-value pairs and said each entry includes a first item that is a key of said associated one key-value pair and a second item that identifies a location of a data value of said associated one key-value pair, wherein said location of each of the plurality of entries varies in accordance with a policy; and
returning a response to the application.

2. The method of claim 1, wherein the key-value data store uses key-value pairs including the plurality of key-value pairs, each of said key-value pairs including a unique key that is mapped to a corresponding data item.

3. The method of claim 1, wherein the mapping table maps said first key to a physical location including said first data item.

4. The method of claim 3, wherein said mapping table specifies a mapping for each of said key-value pairs by mapping the unique key of said each key-value pair to the corresponding data item stored on solid state storage.

5. The method of claim 1, wherein the application is executing on any of a first host or a first computation node of the data storage system, and the data storage system processes one or more other requests also sent from any of a second host or a second computation node of the data storage system in accordance with any of a block-based protocol and a file-based protocol.

6. The method of claim 5, wherein the one or more other requests are sent from any of the second host or the second computation node as a result of second processing performed thereon, said second processing including processing performed by at least one of a file system and a logical volume manager.

7. The method of claim 6, wherein the request to perform the data operation on the key-value data store is sent from any of the first host or the first computation node without having processing performed by a file system and without having processing performed by the logical volume manager.

8. The method of claim 1, wherein the first processing on the data storage system uses the first key to directly map the first key into an internal data storage system representation used to identify a location of the first data item.

9. The method of claim 1, wherein the data operation performs any of: writes a first data item mapped to the first key, reads the first data item mapped to the first key, deletes the first data item mapped to the first key, deletes the first key and first data item from the key-value data store, and creates a new entry in the key-value data store whereby the new entry has the first key mapped to the first data item.

10. A system comprising:
a storage grid including a plurality of components, said components including one or more storage devices;
a key-value data store having data stored on at least one of said one or more storage devices;
a plurality of computation nodes, each computation node including one or more processors, wherein a first of the plurality of computation nodes sends a request to the storage grid to perform a data operation on the key-value data store, the request being in accordance with an application level protocol for performing the data operation on the key-value data store, wherein the request includes a first key of a first key-value pair used to perform the data operation;
an interface facilitating communications between the plurality of computation nodes and the storage grid; and
a non-transitory computer readable medium comprising code stored thereon that, when executed, performs a method comprising:
receiving the request from the first computation node to perform the data operation on the key-value data store;
processing the request for performing the data operation on the key-value data store that is received from the first computation node in accordance with the application level protocol, wherein said processing the request uses a mapping table to map the first key to a first value that is a first data item corresponding to the first key, wherein the mapping table includes a plurality of entries for a plurality of key-value pairs including the first key-value pair, wherein each of the plurality of entries corresponds to an associated one of the plurality of key-value pairs and said each entry includes a first item that is a key of said associated one key-value pair and a second item that identifies a location of a data value of said associated one key-value pair, wherein said location of each of the plurality of entries varies in accordance with a policy; and
returning a response to the first computation node.

11. The system of claim 10, wherein the plurality of computation nodes includes a second computation node including a plurality of software layers comprising a file system layer and a logical volume manager, wherein a second request to perform a data operation is sent from the second computation node to the storage grid as a result of processing performed by the plurality of software layers, the second request including data in accordance with any of a file-based protocol and a block-based protocol.

12. The system of claim 11, wherein the first computation node includes a second plurality of software layers including the file system layer and the logical volume manager, and wherein the first computation node sends the first request without performing processing by the second plurality of software layers.

13. The system of claim 10, wherein the first computation node executes code for a key-value client.

14. The system of claim 10, wherein the key-value data store uses key-value pairs including the plurality of key-value pairs, each of said key-value pairs including a unique key that is mapped to a corresponding data item.

15. The system of claim 14, wherein processing the request for performing the data operation on the key-value data store that is received from the first computation node in accordance with the application level protocol includes using the mapping table that maps said first key to a physical location including said first data item.

16. The system of claim 15, wherein said mapping table specifies a mapping for each of said key-value pairs by mapping the unique key of said each key-value pair to the corresponding data item stored on solid state storage.

17. The system of claim 10, wherein the system performs a plurality of data services including any of data replication, mirroring, data backup, data recovery, and data restoration, and wherein any one or more of the plurality of data services are performed for the key-value data store.

18. A system comprising:
a data storage system including a key-value data store, a front-end director and a first non-transitory computer readable medium comprising code stored thereon for a key-value server, wherein said front end director receives a request from an application to perform a data operation on the key-value data store, wherein the request to perform the data operation on the key-value data store is then further processed by the key-value server, wherein said key-value server processes the request in accordance with an application level protocol for performing the data operation on the key-value data store and wherein the first non-transitory computer readable medium further comprises code stored thereon to process the request in connection with performing the data operation, the first non-transitory computer readable medium comprising code that, when executed, performs a method comprising:
performing first processing to service the data operation; and
returning a response to the application;
one or more hosts including a host sending the request from the application executing on the host and wherein the host includes a second non-transitory computer readable medium comprising code thereon that, when executed, performs a method comprising:
sending the request to perform the data operation on the key-value data store, the request being in accordance with the application level protocol for performing the data operation on the key-value data store, wherein the request includes a first key of a first key-value pair used by the data storage system to perform the data operation, and wherein said first processing uses a mapping table to map the first key to a first value that is a first data item corresponding to the first key, wherein the mapping table includes a plurality of entries for a plurality of key-value pairs including the first key-value pair, wherein each of the plurality of entries corresponds to an associated one of the plurality of key-value pairs and said each entry includes a first item that is a key of said associated one key-value pair and a second item that identifies a location of a data value of said associated one key-value pair, wherein said location of each of the plurality of entries varies in accordance with a policy.

* * * * *